US012003016B2

(12) United States Patent
Colapietro et al.

(10) Patent No.: US 12,003,016 B2
(45) Date of Patent: Jun. 4, 2024

(54) PERFORATED DOOR FOR MONOPOLE MODULE AND METHOD OF MOUNTING SAME

(71) Applicant: CommScope Technologies LLC, Hickory, NC (US)

(72) Inventors: Julian R. Colapietro, McKinney, TX (US); Ulrich A. Gienger, Fairview, TX (US); Kevin Rovell, Arlington, TX (US)

(73) Assignee: COMMSCOPE TECHNOLOGIES LLC, Claremont, NC (US)

(*) Notice: Subject to any disclaimer, the term of this patent is extended or adjusted under 35 U.S.C. 154(b) by 1245 days.

(21) Appl. No.: 16/655,986

(22) Filed: Oct. 17, 2019

(65) Prior Publication Data

US 2020/0136236 A1 Apr. 30, 2020

Related U.S. Application Data

(60) Provisional application No. 62/846,172, filed on May 10, 2019, provisional application No. 62/752,073, filed on Oct. 29, 2018.

(51) Int. Cl.

*H01Q 21/00* (2006.01)
*H01Q 1/24* (2006.01)
*H01Q 1/42* (2006.01)
*H01Q 1/02* (2006.01)

(52) U.S. Cl.

CPC ............... *H01Q 1/243* (2013.01); *H01Q 1/42* (2013.01); *H01Q 21/0025* (2013.01); *H01Q 1/02* (2013.01)

(58) Field of Classification Search

CPC ...... H01Q 1/243; H01Q 1/42; H01Q 21/0025; H01Q 1/02; H01Q 1/1242; H01Q 9/34; E04H 12/003; E04H 12/08

See application file for complete search history.

(56) References Cited

U.S. PATENT DOCUMENTS 5,963,178 A * 10/1999 Jones .................. H01Q 1/1242 343/890
5,995,063 A * 11/1999 Somoza .................. H01Q 1/12 343/890
6,222,503 B1 * 4/2001 Gietema .................. H01Q 1/44 343/890
8,624,793 B2 * 1/2014 Caldwell .............. H01Q 1/1242 343/890

(Continued)

FOREIGN PATENT DOCUMENTS

CN 201050717 Y * 4/2008 ............. Y02B 20/72
CN 101217858 B * 6/2010 ......... H05K 7/20136
EP 1401048 A1 * 3/2004 ........... H01Q 1/1242

*Primary Examiner* — Hasan Islam
*Assistant Examiner* — Bamidele A Immanuel
(74) *Attorney, Agent, or Firm* — Myers Bigel, P.A.

(57) ABSTRACT

A modular monopole for wireless communications includes: an antenna module having a floor, a ceiling and a side wall that form an antenna compartment, wherein at least one antenna resides within the antenna compartment; a radio module having a floor, a ceiling and a side wall that form a radio compartment, wherein at least one remote radio unit (RRU) resides within the radio compartment; and a base. The base, the radio module, and the antenna module are arranged in vertically stacked relationship, with the base below the radio module and the antenna module above the radio module.

4 Claims, 22 Drawing Sheets

(56) References Cited

U.S. PATENT DOCUMENTS

| | | | | |
|---|---|---|---|---|
| 9,433,034 | B2 | 8/2016 | Hendrix et al. | |
| 9,642,186 | B1 * | 5/2017 | Dureja | H04W 88/10 |
| 9,660,328 | B2 * | 5/2017 | Wild | H01Q 1/246 |
| 9,698,477 | B1 * | 7/2017 | Jabara | E04H 12/342 |
| 9,837,698 | B2 * | 12/2017 | Lasier | H01Q 1/06 |
| 9,869,822 | B2 * | 1/2018 | Islam | G02B 6/3846 |
| 9,941,917 | B2 * | 4/2018 | Wang | H04B 1/40 |
| 10,199,712 | B1 * | 2/2019 | Boyle | F21S 8/085 |
| 10,247,899 | B2 * | 4/2019 | Islam | G02B 6/4416 |
| 10,347,979 | B1 * | 7/2019 | Boyle | H01Q 1/1228 |
| 10,447,025 | B2 * | 10/2019 | Islam | H02H 7/20 |
| 11,417,943 | B2 * | 8/2022 | Hendrix | H04B 1/036 |
| 2010/0026604 | A1 * | 2/2010 | Caldwell | H01Q 1/1242 343/890 |
| 2010/0231469 | A1 * | 9/2010 | Kim | H01Q 1/246 343/890 |
| 2010/0317278 | A1 * | 12/2010 | Novick | F24F 11/0001 62/401 |
| 2012/0132781 | A1 * | 5/2012 | Kolokotronis | H01Q 1/1242 248/535 |
| 2014/0182811 | A1 * | 7/2014 | Hager | H01Q 1/02 165/104.34 |
| 2015/0057047 | A1 * | 2/2015 | Hendrix | H04B 1/40 455/562.1 |
| 2015/0189692 | A1 * | 7/2015 | Portolan | H04J 3/065 370/338 |
| 2015/0219856 | A1 * | 8/2015 | Wang | G02B 6/3817 385/53 |
| 2016/0276817 | A1 * | 9/2016 | Wang | H02G 9/02 |
| 2017/0301220 | A1 * | 10/2017 | Jarrell | H04W 4/70 |
| 2017/0324154 | A1 * | 11/2017 | Hendrix | H01Q 1/42 |
| 2019/0261456 | A1 * | 8/2019 | Lee | H01Q 1/1242 |

* cited by examiner

PERFORATED DOOR FOR MONOPOLE MODULE AND METHOD OF MOUNTING SAME

RELATED APPLICATION

The present application claims priority from and the benefit of U.S. Provisional Patent Application Nos. 62/752,073, filed Oct. 29, 2018, and 62/846,172, filed May 10, 2019, the disclosures of which are hereby incorporated by reference herein in full.

FIELD OF THE INVENTION

The present application is directed generally toward communication antennas, and more particularly to mounting structures for communications antennas.

BACKGROUND

As wireless data service demands have grown, a conventional response has been to increase the number and capacity of conventional cellular Base Stations (Macro-Cells). Such Macro-Cells are typically mounted on antenna towers. A conventional antenna tower has three or four legs on which antennas and supporting remote radio units (RRUs) are mounted. However, in some environments structures known as "monopoles" are used as mounting structures. A typical monopole 10 with antennas 20 mounted on mounting frames 30 is shown in FIG. 1. Monopoles are typically employed when fewer antennas/RRUs are to be mounted, and/or when a structure of less height is required.

In addition, Macro-Cell sites are becoming less available, and available spectrum limits how much additional capacity can be derived from a given Macro-Cell. Accordingly, small cell RRU and antenna combinations have been developed to "fill in" underserved or congested areas that would otherwise be within a Macro-Cell site. Deployment of small cells, particularly in urban environments, is expected to continue to grow. Often such small cell configurations (sometimes termed "metrocells") are mounted on monopoles.

In view of the foregoing, it may be desirable to provide additional monopole arrangements.

SUMMARY

As a first aspect, embodiments of the invention are directed to a modular monopole for wireless communications. The modular monopole comprises: an antenna module having a floor, a ceiling and a side wall that form an antenna compartment, wherein at least one antenna resides within the antenna compartment; a radio module having a floor, a ceiling and a side wall that form a radio compartment, wherein at least one remote radio unit (RRU) resides within the radio compartment; and a base. The base, the radio module, and the antenna module are arranged in vertically stacked relationship, with the base below the radio module and the antenna module above the radio module.

In some embodiments, the base includes a power distribution unit.

In other embodiments, the base includes an air flow unit that helps to direct cooling air into modules stacked above the base.

In further embodiments, the monopole may rely on passive cooling air that enters an equipment module through an air intake section (typically perforated) and exits through an air exit section (also often perforated). In such embodiments, one or more baffles may be present in the module to direct air that has entered through the air intake section to the air exit section.

DETAILED DESCRIPTION

Figure 1:
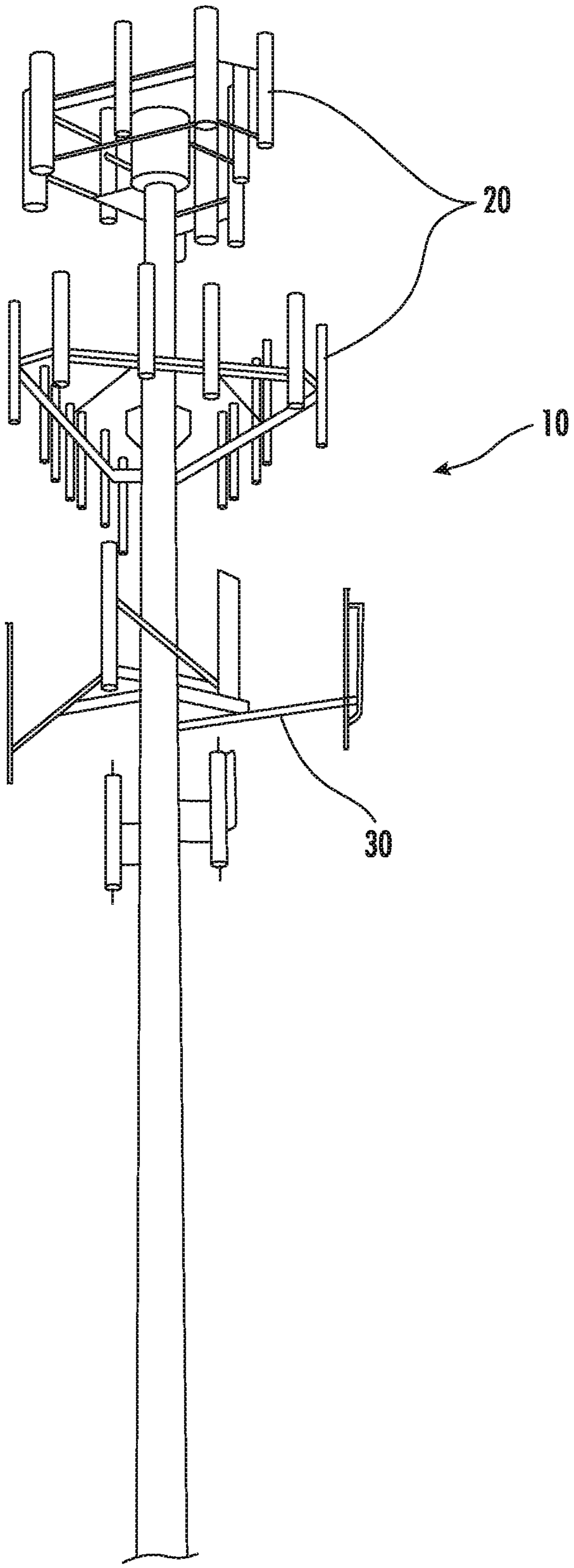
FIG. 1 is front view of a conventional monopole with four antenna frames and accompanying antennas mounted thereon.

The present invention will now be described more fully hereinafter, in which embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout. Thicknesses and dimensions of some components may be exaggerated for clarity.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the expression "and/or" includes any and all combinations of one or more of the associated listed items.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. The device may be otherwise oriented (rotated 90 degrees or at other orientations) and the spatially relative descriptors used herein interpreted accordingly.

Well-known functions or constructions may not be described in detail for brevity and/or clarity.

Figure 2:
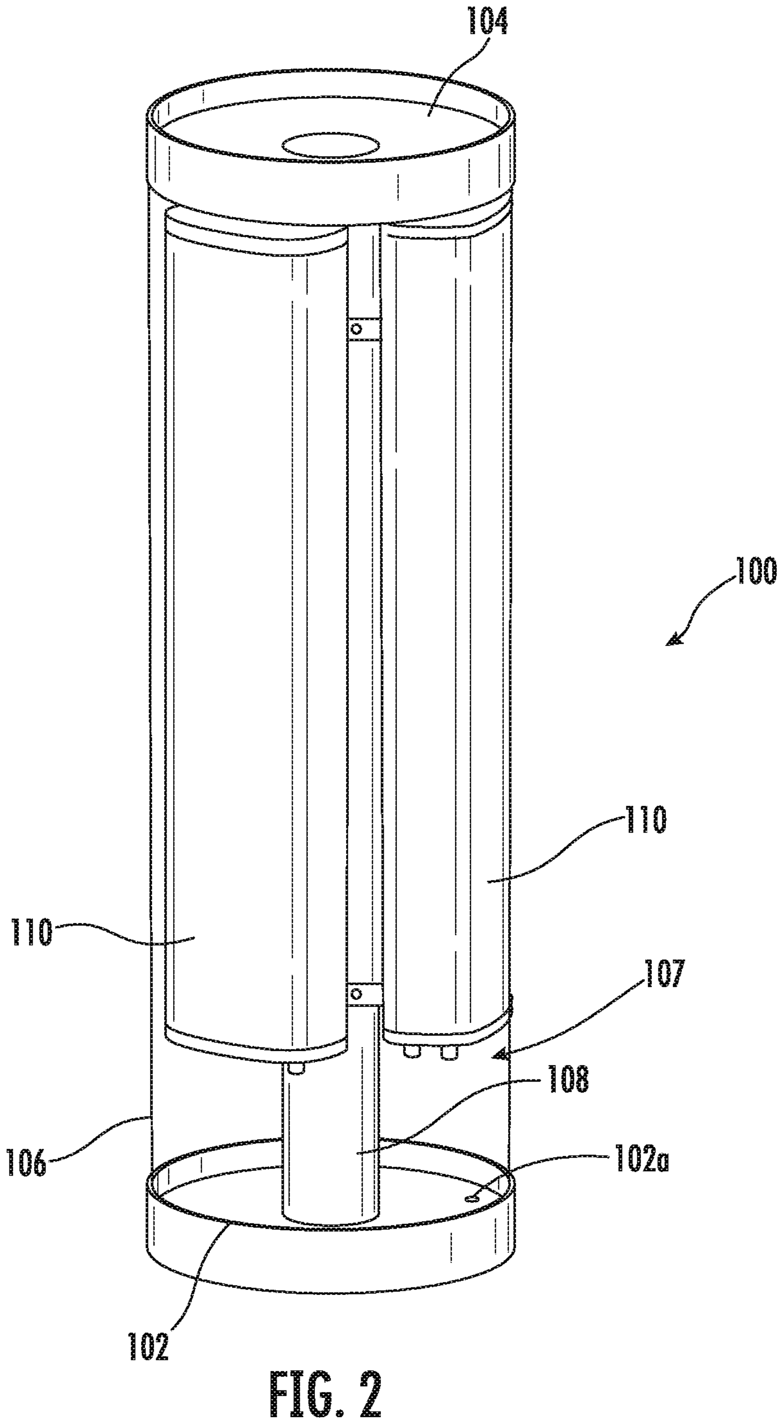
FIG. 2 is a front view of an antenna module for a modular monopole according to embodiments of the invention.
Figure 3:
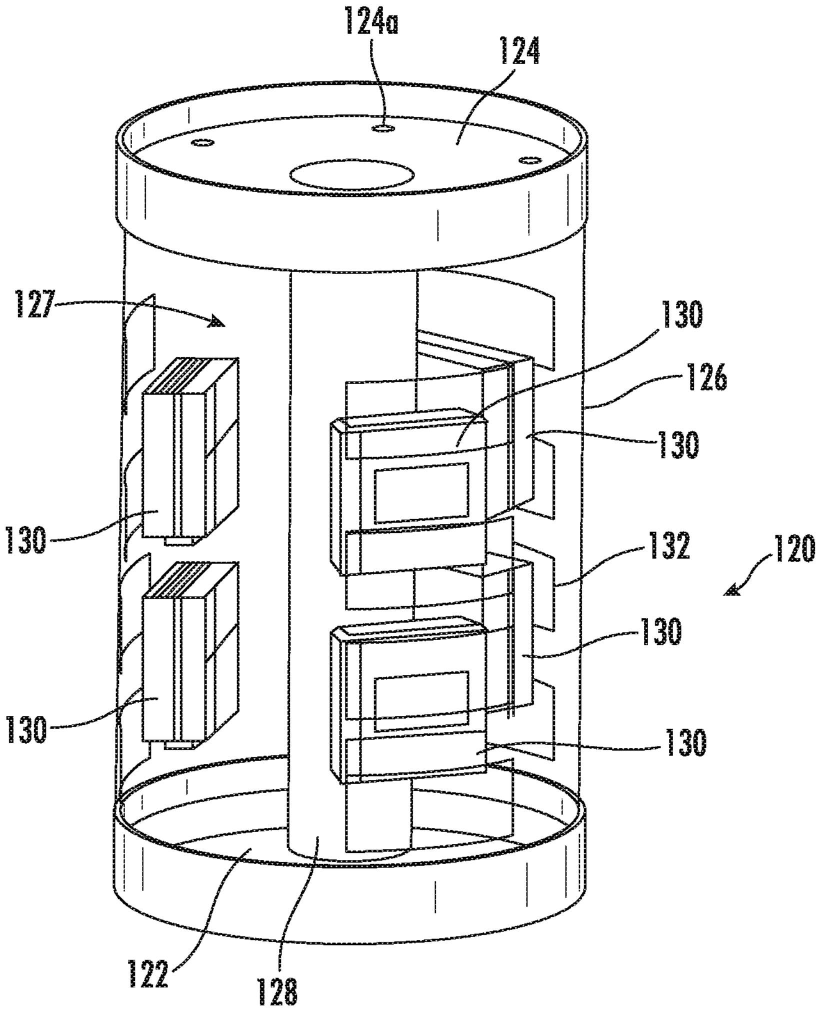
FIG. 3 is a front view of a radio module for a modular monopole according to embodiments of the invention.
Figure 4:
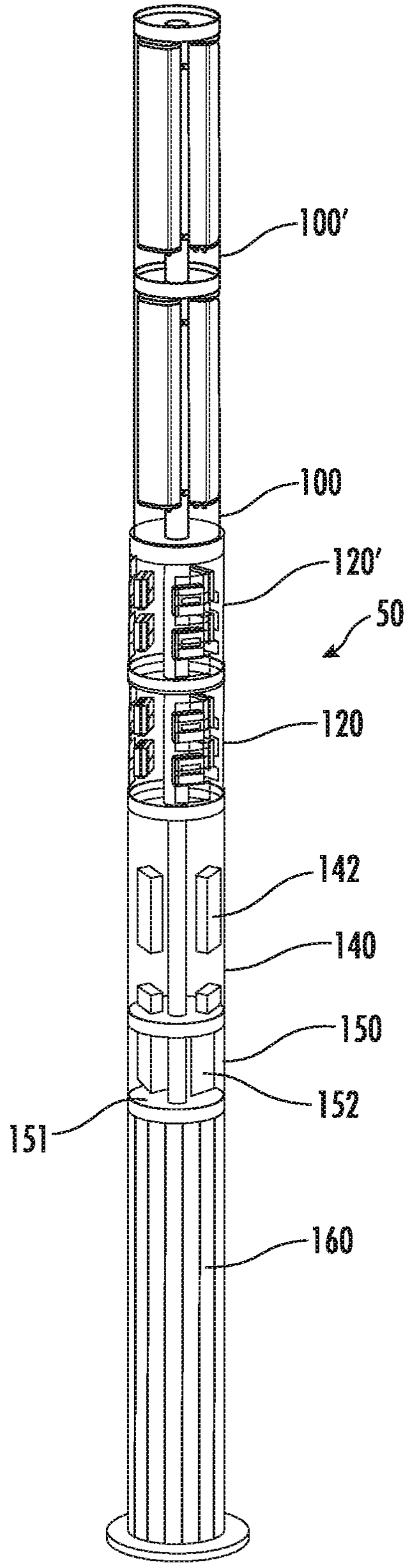
FIG. 4 is a front view of a modular monopole according to embodiments of the invention.

Referring now to FIGS. 2-4, an antenna module for a modular monopole, designated broadly at 100, is shown therein. The antenna module 100 includes a circular floor 102, a circular ceiling 104, and a cylindrical side wall 106 that extends between the floor 102 and the ceiling 104 that form an antenna compartment 107. A hollow post 108 extends through the center of the module 100 between the floor 102 and the ceiling 104. Three antennas 110 are mounted to the post 108 within the side wall 106.

Referring now to FIG. 3, a radio module 120 for a modular monopole is illustrated therein. Similar to the antenna module 100, the radio module 120 includes a circular floor 122, a circular ceiling 124, and a cylindrical side wall 126 that extends between the floor 122 and the ceiling 124 that form a radio compartment 127. A hollow post 128 extends through the center of the module 100 between the floor 122 and the ceiling 124. Six RRUs 130 are mounted to the post 128 within the side wall 126 (typically with an adapter bracket or the like). The side wall 126 may also have vents 132 (which may be perforated patterns of small holes) that can provide the RRUs 130 with ventilation to prevent overheating.

The floors 102, 122, ceilings 104, 124, and posts 108, 128 of the antenna module 100 and the radio module 120 are typically formed of a metallic material, such as steel or aluminum. The side walls 126 of the radio module 120 are typically formed of a metallic material such as aluminum. The side walls 106 of the antenna module 100 are typically formed of a dielectric panel material or a durable fabric, either of which are substantially transparent to radio frequency signals. Exemplary materials include ABS polymer (for a dielectric panel) and high performance polyester microyarn-based cloth (for a durable fabric).

As can be seen from FIGS. 2 and 3, the radio module 120 is typically shorter than the antenna module 100; the radio module 120 may be between about 1.0 and 2.0 feet in height, whereas the antenna module 100 may be between about 3.0 and 6.0 feet in height. The radio module 120 and the antenna module 100 are typically substantially identical in diameter (e.g., between about 5.0 and 10.0 feet in diameter for a typical monopole, and between about 8 and 16 inches in diameter for a typical metrocell pole).

Referring now to FIG. 4, a modular monopole, designated broadly at 50, is shown therein. The monopole 50 is constructed of individual sections, including one or more antenna modules 100 and one or more radio modules 120, along with additional sections. The exemplary monopole 20 shown in FIG. 4 includes two antenna modules 100, 100' stacked vertically at the top of the monopole 20 and two radio modules 120, 120' stacked vertically immediately below the antenna modules 100, 100'. The illustrated monopole 50 also includes another radio module 140, which houses RRUs 142 of a different type and size, below the radio modules 120, 120'. Those skilled in this art will appreciate that RRUs of virtually any configuration may be suitable for inclusion in a radio module.

Still referring to FIG. 4, a distribution module 150 is located below the radio module 140. The distribution module 150 includes enclosures 152 within a distribution compartment 151 in which optical fibers and power conductors from a hybrid trunk cable are broken out for distribution to the RRUs 130, 142. Exemplary enclosures include those discussed in U.S. Patent Publication Nos. 2016/0276817 and 2015/0219856 to Wang, the disclosures of which are hereby incorporated herein. Other configurations for breaking out and distributing optical fibers and power conductors, which may take the form of an enclosure, a fan-out device or pigtail transition device, or the like, may also be employed.

Referring still to FIG. 4, a base 160 is located below the distribution module 150. The base 160 serves as a foundation for the monopole 50. Typically, the base 160 is between about 4.0 and 10.0 feet in height to provide elevation to the components, such as the RRUs 130, 142 and the antennas 110, that perform optimally when located well above the ground.

Each of the radio module 140, the distribution module 150 and the base 160 typically has a diameter that is substantially identical to those of the antenna and radio modules 100, 100', 120, 120', such that the monopole 50 is of substantially constant diameter much like a typical one-piece monopole. Although the modular monopole 50 may be of any height, typically the modular monopole 20 has a height of between about 35 and 70 feet, with the antenna modules 100, 100' being at least 25 to 60 feet off of the ground. Also, the base 160, the distribution module 150 and the radio module 140 typically include hollow posts similar to the posts 108, 128 of the modules 100, 120, such that a central vertical passageway is formed in the center of the monopole 50.

Those skilled in this art will appreciate that other number or types modules may be added to the monopole 50, and some of these modules may be omitted in some embodiments. It is also contemplated that, although the modules are illustrated as being cylindrical, they may take other shapes (e.g., triangular or square), and they may have differing cross-sectional sizes (e.g., the modules may decrease in diameter with increasing height to form an elongated conical or stepped monopole).

The various modules may be secured to each other in many ways. As an example, fasteners may be inserted through holes in the floors and ceilings (see, e.g., holes 124*a* in the ceiling 124 of the radio module 120 and holes 102*a* in the floor 102 of the antenna module 100) to secure the modules to each other. Alternatively, the posts of the modules may have a relatively narrowed section at one end that fits within a relatively wider section of the post of the adjacent module. Other mounting techniques may also be employed. As another alternative, a vertical mast (not shown) may extend through the passageway formed by the hollow posts of the various modules (including the posts 128, 108 of the radio and antenna modules 100, 120) to maintain the modules in a stacked relationship.

It is also envisioned that cables for the RRUs 130 and antennas 110 may be routed from the ground through the empty interior passageways formed by the posts 108, 128 (and similar posts in the other modules) into the appropriate modules. In such a configuration, the posts of the various modules would have access holes, slots or the like to enable a trunk cable to be routed from the interior of the posts to the distribution module 150, and for jumper cables to be routed from the distribution module 150 to the RRUs 130 and from the RRUs 130 to the antennas 110. As an example, a trunk cable may be routed from the ground through the base 160 to the enclosures 152 of the distribution module 150. Jumper cables may be routed from the enclosures 152 within the distribution module 150 to the post of the distribution module 150 and to the radio modules 140, 120, 120' for interconnection with the RRUs 142, 130. Additional jumper cables may then be routed from the RRUs 130 into the post 128, then up to the appropriate antenna modules 100, 100' for interconnection with the antennas 110.

Alternatively, a cable may be routed from the ground through passageways in the modules until the cables reach the first module requiring interconnection (e.g., the distribution module 150), and jumper cables can be routed from that module to additional modules through routing holes in the ceilings and floors of the modules.

In some embodiments, one or more of the modules may include features for rotational alignment (e.g., keys and grooves, pins and holes, and the like) to ensure proper relative orientation of the modules. In addition, in some embodiments the posts of the modules may include features (e.g., shims) that ensure that the resulting monopole is vertically straight. Alternatively, some or all of the modules may include leveling features (e.g., set screws, threaded feet, etc.) that can level individual modules to ensure vertical deployment.

Use of modules such as the antenna module 100 and the radio module 120 can enable a manufacturer to "mix and match" modules in the factory to a configuration desired by the end user. The various modules can be packaged as a kit and shipped to the installation site for final assembly. In this manner, no on-site mounting of RRUs, antennas and the like may be required. In addition, some quality testing that is typically performed in the field (e.g., radio frequency (RF) performance testing) may be performed in the factory.

Figure 5:
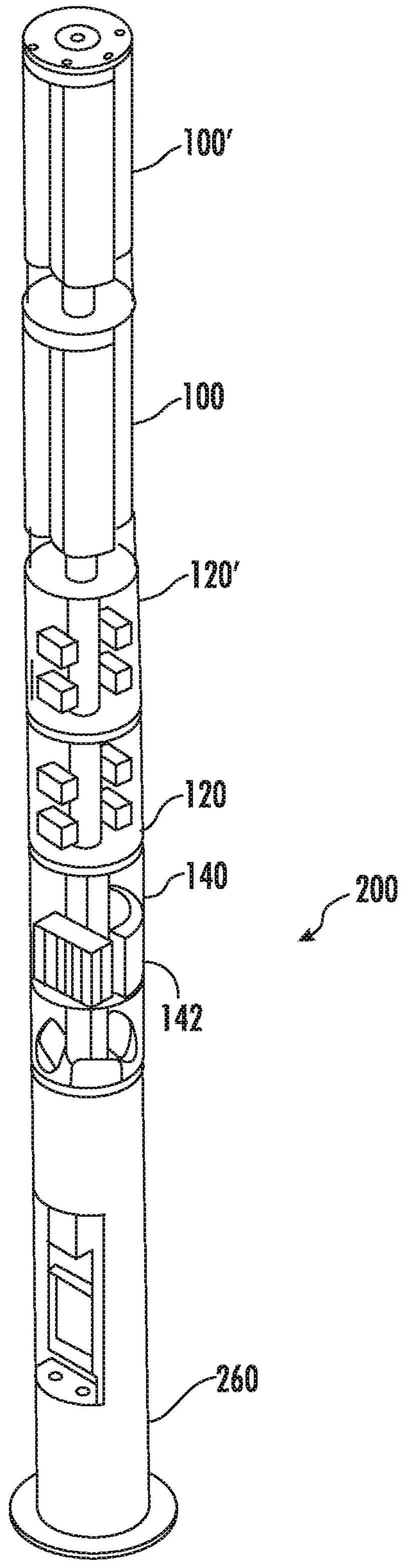
FIG. 5 is a front view of a modular monopole according to embodiments of the invention.
Figure 6:
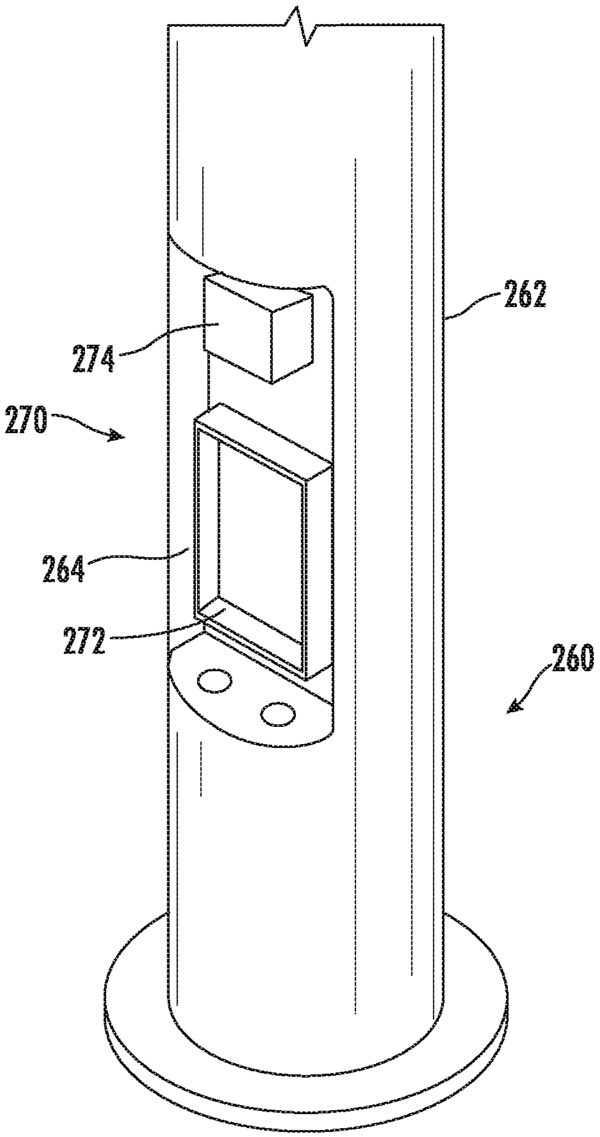
FIG. 6 is a front view of a base section of the modular monopole of FIG. 5 showing a cable distribution unit.

Referring now to FIGS. 5 and 6, a modular monopole, designated broadly at 200, is shown therein. Like the monopole 50, the monopole 200 is constructed of individual sections, including one or more antenna modules and one or more radio modules, along with optional additional sections. The exemplary monopole 200 shown in FIG. 5 includes two antenna modules 100, 100' stacked vertically at the top of the monopole 200, two radio modules 120, 120' stacked vertically immediately below the antenna modules 100, 100', and another radio module 140 of a different type and size, below the radio modules 120, 120'. A base section 260 is located below the radio module 140. The antenna modules 100, 100' and radio modules 120, 120', 140 are as described above.

The base section 260 is located beneath the radio module 140 and provides a solid foundation for the remaining modules of the monopole 200 via side walls 262. The base section 260 may be substantially hollow and/or may include a hollow post similar to the posts 108, 128 of the modules 100, 120, such that a central vertical passageway is formed in the center of the monopole 200 through the posts of the various modules. Typically the base section 260 is formed of steel.

As can be seen in FIG. 6, the base section 260 includes a window 264 in the side wall 262. In some embodiments, a reinforcing rim, braces or the like may be associated with the window 264 to combat a tendency of the base section 260 to buckle under loading. The window 264 may optionally be covered by a door (not shown).

Within the window 264 is mounted a cable distribution unit 270. The cable distribution unit 270 receives one or more trunk cables (not shown), which may include power conductors, optical fibers, or both, and breaks them out into multiple cables that are routed to the RRUs of the monopole. In the illustrated embodiment, the cable distribution unit 270 includes a power distribution unit 272 and a fiber distribution unit 274, although in some embodiments one of these distribution units may be omitted, and in other embodiments the power and fiber distribution units 272, 274 may be combined in a single assembly. One or more trunk cables are routed to the power and fiber distribution units 272, 274, and power and/or fiber cables are routed from the power and fiber distribution units 272, 274 to the RRUs 130, 142 of the radio modules 120, 140. From there jumper cables are routed to the antennas 110 of the antenna modules 100, 100'.

In some embodiments, cables may be routed from the cable distribution unit 270 in the base section 260 to the radio modules 120, 140 through the empty interior passageways within the posts 128 (and similar posts in the other modules) into the appropriate modules. In such a configuration, the posts of the various modules would have access holes, slots or the like to enable cables to be routed from the base section 260 to the RRUs 130 and from the RRUs 130 to the antennas 110. As an example, a trunk cable may be routed from the ground into the base section 260 to the power and fiber distribution units 272, 274. Jumper cables may be routed from the power and fiber distribution units 272, 274 within the cable distribution unit 270 into the post of the base section 260 and to the radio modules 140, 120, 120' for interconnection with the RRUs 142, 130. Additional jumper cables may then be routed from the RRUs 130 into the post 128, then up to the appropriate antenna modules 100, 100' for interconnection with the antennas 110.

Alternatively, jumper cables can be routed from the base section 260 or from one of the radio modules 120, 140 to additional modules through routing holes in the ceilings and floors of the various modules and the base section 260.

The foregoing demonstrates that the monopole 200 capitalizes on the otherwise unused empty space within the base section 260 to house the cable distribution unit 270. The use of the space within the base section 260 can free up other portions of the monopole 200 to provide other functions, or can simply enable a less expensive "spacer" module to be employed instead of a separate cable distribution unit.

Those skilled in this art will also appreciate that the use of a base section 260 that houses a cable distribution unit 270 may also be employed with a standard (i.e., non-modular) monopole, or a two-piece monopole that includes a separate base section and a single upper piece on or in which the remaining components are mounted.

Figure 7:
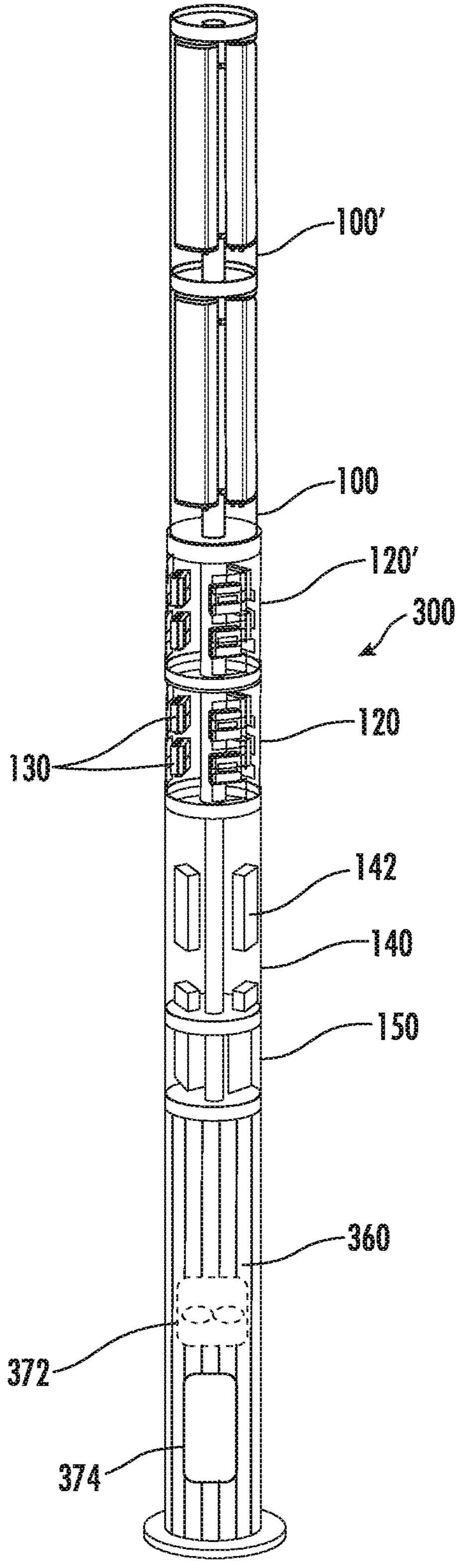
FIG. 7 is a front view of a modular monopole according to embodiments of the invention.
Figure 8:
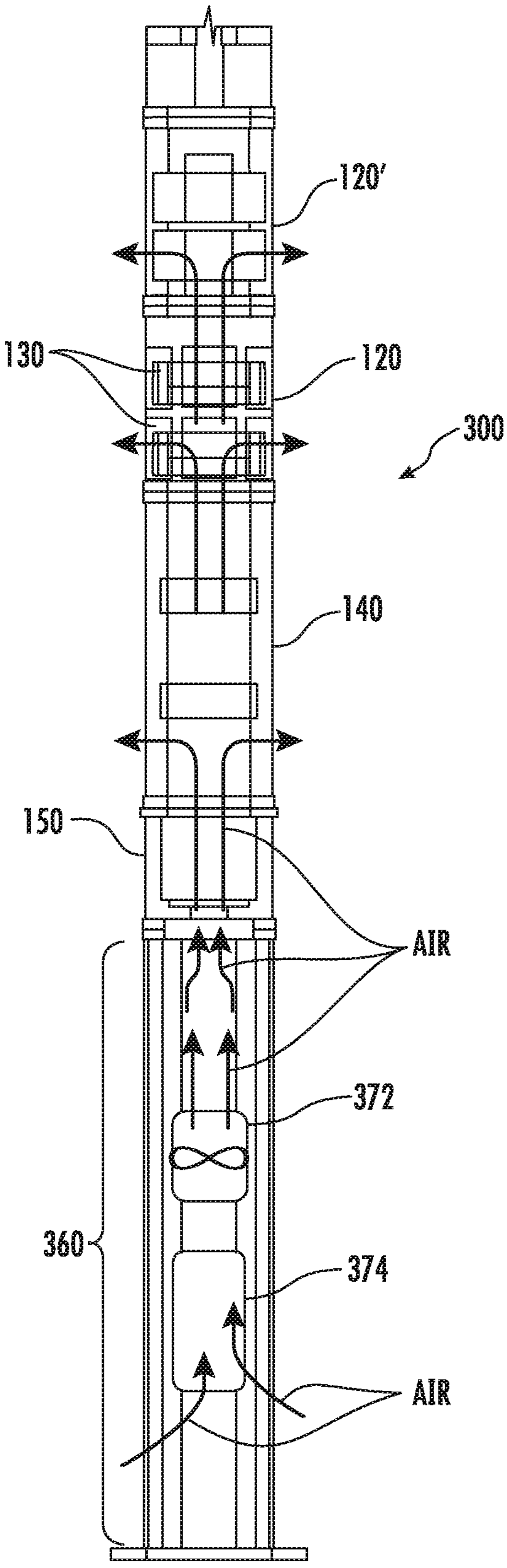
FIG. 8 is a schematic diagram of a portion of a modular monopole according to embodiments of the invention.
Figure 9:
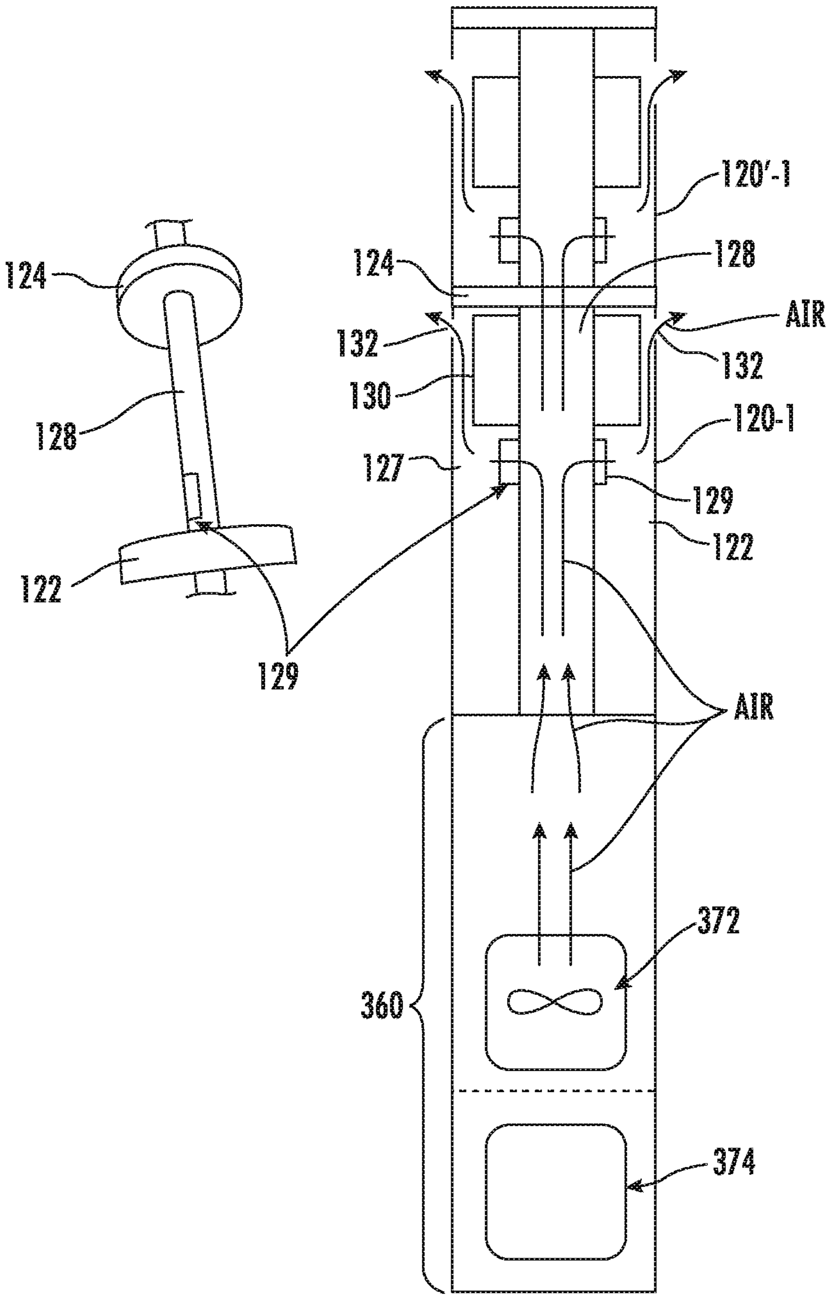
FIG. 9 is a schematic diagram of a portion of a modular monopole and a radio module frame according to embodiments of the invention.

Referring now to FIGS. 7-9, a modular monopole, designated broadly at 300, is shown therein. Like the monopoles 50, 200, the monopole 300 is constructed of individual sections, including one or more antenna modules and one or more radio modules, along with optional additional sections. The exemplary monopole 300 shown in FIG. 7 includes two antenna modules 100, 100' stacked vertically at the top of the monopole 300, two radio modules 120, 120' stacked vertically immediately below the antenna modules 100, 100', another radio module 140 of a different type and size, below the radio modules 120, 120', a distribution module 150, and a base section 360 is located below the radio module 140. The antenna modules 100, 100', radio modules 120, 120', 140 and distribution module 150 are as described above. The base 360 is located below the distribution module 150 and serves as a foundation for the monopole 300.

When the RRUs 130, 142 are being operated, the RRUs 130, 142 generate heat and heat air in the radio modules 120, 120', 140. To cool down the RRUs 130, 142, an air conveying unit 372 and an air intake section 374 are provided in the base 360. In some embodiments, the air intake section 374 may be below the air conveying unit 372 as illustrated in FIG. 7. The air conveying unit 372 may be concealed in the base 360 and may not be visible from outside. In some embodiments, the air conveying unit 372 may be a fan. The air intake section 374, which may be perforated or a fully open section, may define an outer side wall of the base 360 and may be visible from outside.

Referring to FIG. 8, cool air (e.g., outside air) may enter the base 360 through the air intake section 374. The air conveying unit 372 may force cool air up through the distribution module 150, the radio module 140, and the radio modules 120, 120', and cool air may exhaust from the radio modules 120, 120', 140 as represented by arrows in FIG. 8.

The distribution module 150, the radio module 140, and the radio modules 120, 120' may be arranged to allow air flow through those modules.

For example, each of the hollow posts 128 of the radio modules 120, 120', 140 may include an opening 129, which allows air (e.g., cool air) to flow from the hollow post 128 to the radio compartment 127. As illustrated in FIG. 9, in some embodiments, the opening 129 may be closer to the floor 122 than the ceiling 124 such that air vertically flows in the radio compartment 127 and cools down the RRUs 130. In some embodiments, the hollow post 128 may include two or more openings 129. Air heated by the RRUs 130 may be vented through the vents 132.

Figure 10:
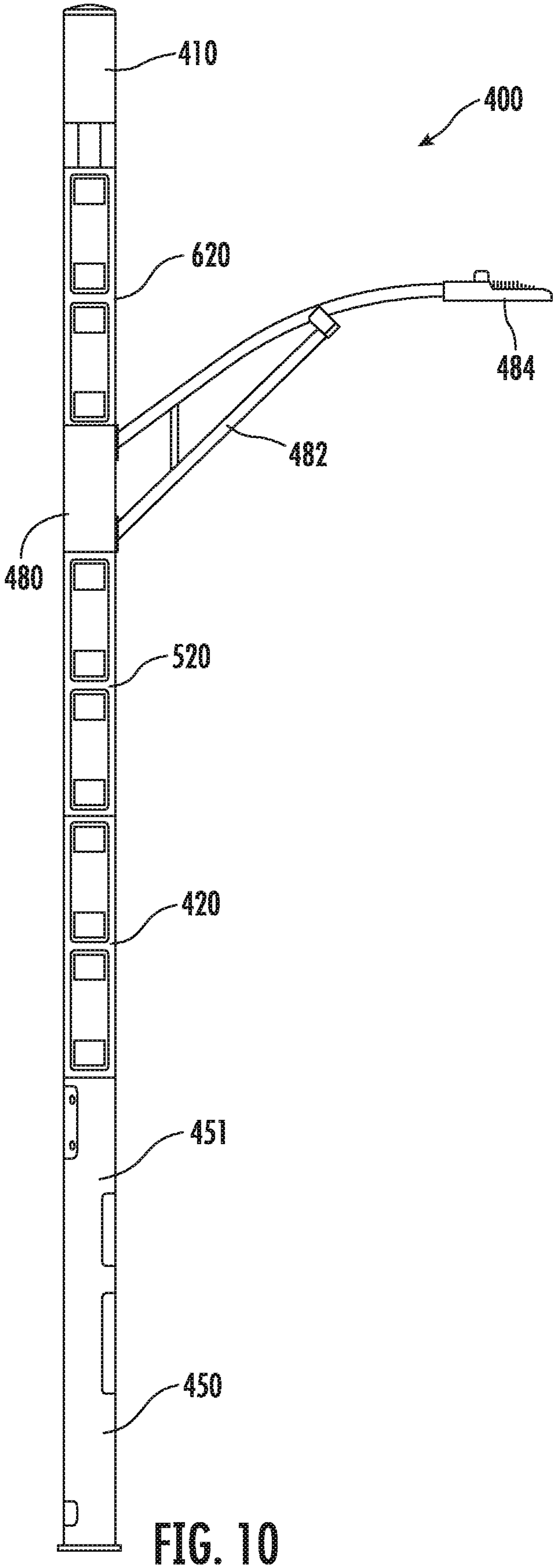
FIG. 10 is a perspective view of a telecommunications pole in the form of a streetlight according to embodiments of the invention.

Multiple of these concepts are included in a telecommunications monopole designated at 400 and shown in FIGS. 10-15. As can be seen in FIG. 10, the monopole 400, which is sized as a "metrocell" having a diameter of between about 10 to 20 inches and a height of between about 20 and 40 feet, is styled as a streetlight, with a power module 450 at the base, equipment modules 420, 520, 620, and an antenna module 410 at the top of the pole 400. In this embodiment, a luminaire mounting section 480 having an arm 482 that mounts a luminaire 484 (such as an LED streetlight) is also included, but may be absent in other embodiments.

Figure 12:
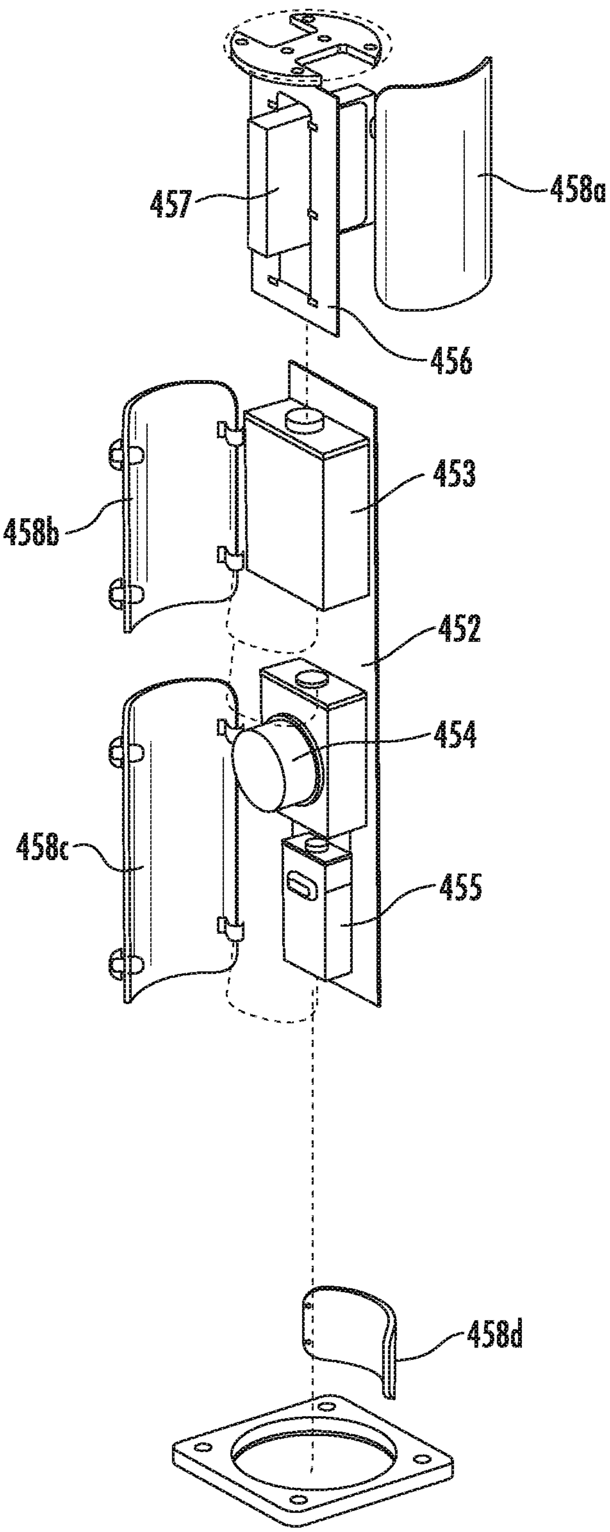
FIG. 12 is a perspective view of an equipment module of the pole of FIG. 10.

Referring now to FIGS. 10 and 12, the power module 450 includes an outer shell 451 within which is mounted a mounting panel 452. An AC load center 453, a power meter 454, and a main disconnect unit 455 are mounted on the mounting panel 451. A second mounting panel 456 is mounted within the outer shell 451, on which is mounted a service aggregation router 457. Access doors **458*a*, 458*b*, 458*c*, 458*d* are attached to the outer shell 451 to provide access to the various equipment located inside the shell 451**.

Figure 11:
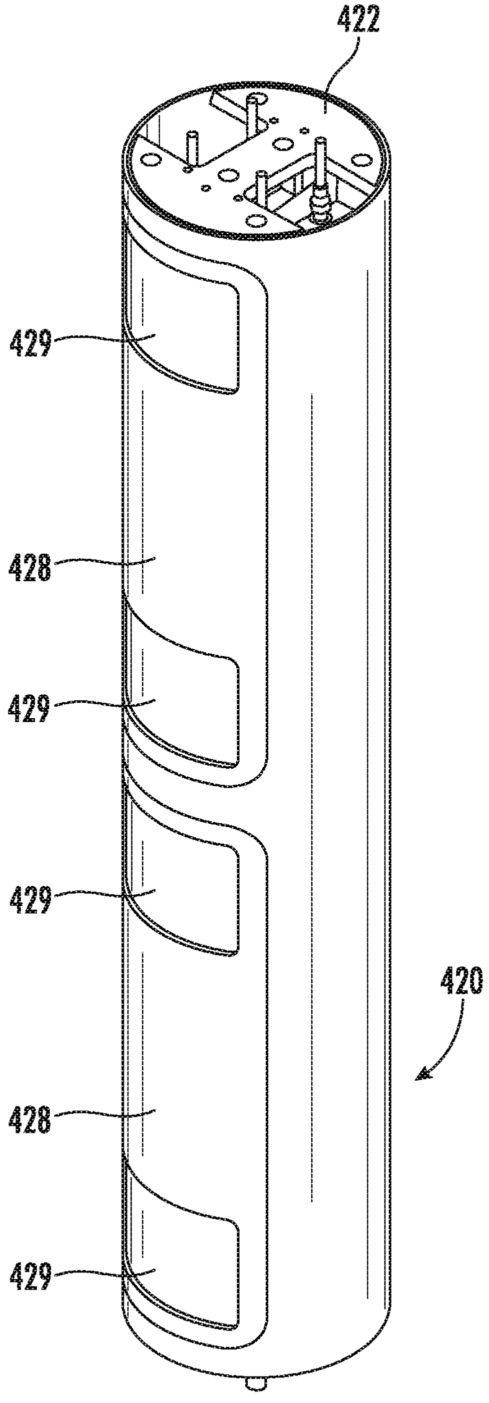
FIG. 11 is an exploded perspective view of a power module of the pole of FIG. 10.
Figure 13:
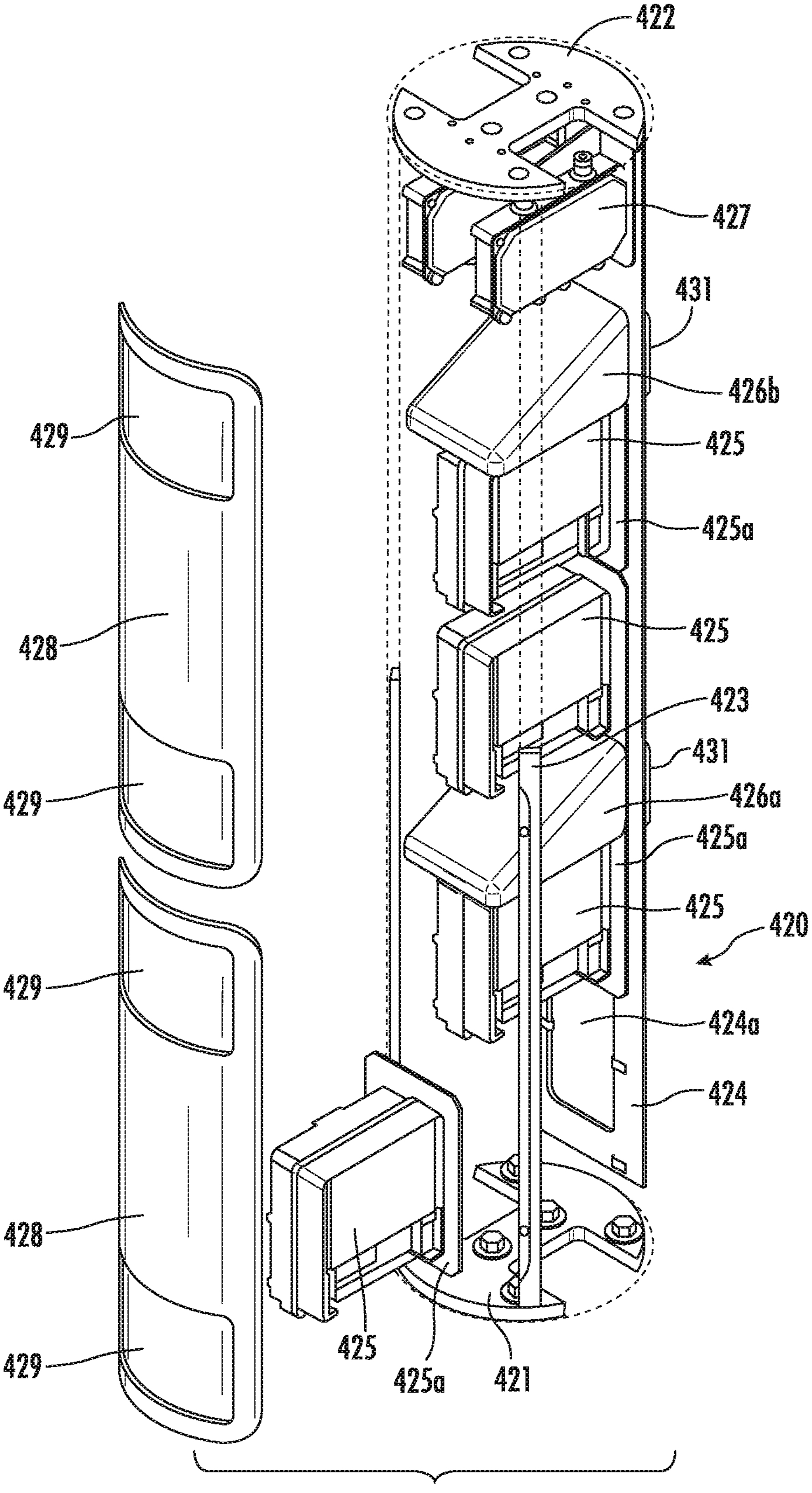
FIG. 13 is an exploded perspective view of the equipment module of FIG. 12.

Referring now to FIGS. 11 and 13, the equipment module 420 includes a floor 421 and a ceiling 422 spanned by uprights 423. A mounting panel 424 with an opening **424*a* extends most of the length of the module 420. Four RRUs 425 are mounted to the mounting panel via three different mounting rims 425*a*, which enable the RRUs to be mounted perpendicularly to the mounting panel 424. A diplexer 427 is mounted to the mounting panel above the RRUs 425 near the ceiling 422**.

Two angled cooling baffles **426*a*, 426*b* are mounted to the mounting panel 424: the baffle 426*a* is mounted above the two lowermost RRUs 425, and the baffle 426*b* is mounted above the two uppermost RRUs 425 and below the diplexer 427. Two doors 428 are mounted to the outer shell 430. Each of the doors 428 includes two perforated sections 429 near its end sections. In addition, the outer shell 430 includes two perforated sections 431, each positioned below the upper surface of a respective baffle 426*a*, 426 and located diametrically opposed to perforated sections 429**.

In this configuration, air flow is directed to provide cooling to the RRUs 425. As an example, external air entering the lowermost perforated section 429 flows upwardly over the two RRUs 425 to cool them, then is directed by the lower baffle **426*a* out of the perforated section 431. External air can also enter the two "center" perforated sections 429, flow upwardly to cool the two uppermost RRUs 425, and exit the upper perforated section 431 (directed by the upper baffle 426). Further, external air can enter the uppermost perforated section 429, cool the diplexer 427, and exit the upper perforated section 431. Thus, this arrangement enables external air to cool the various RRUs 425. Notably, the "exit" perforated sections 431 are located on the opposite side of the module 420 from the "entry" perforated sections 429**.

Figure 14:
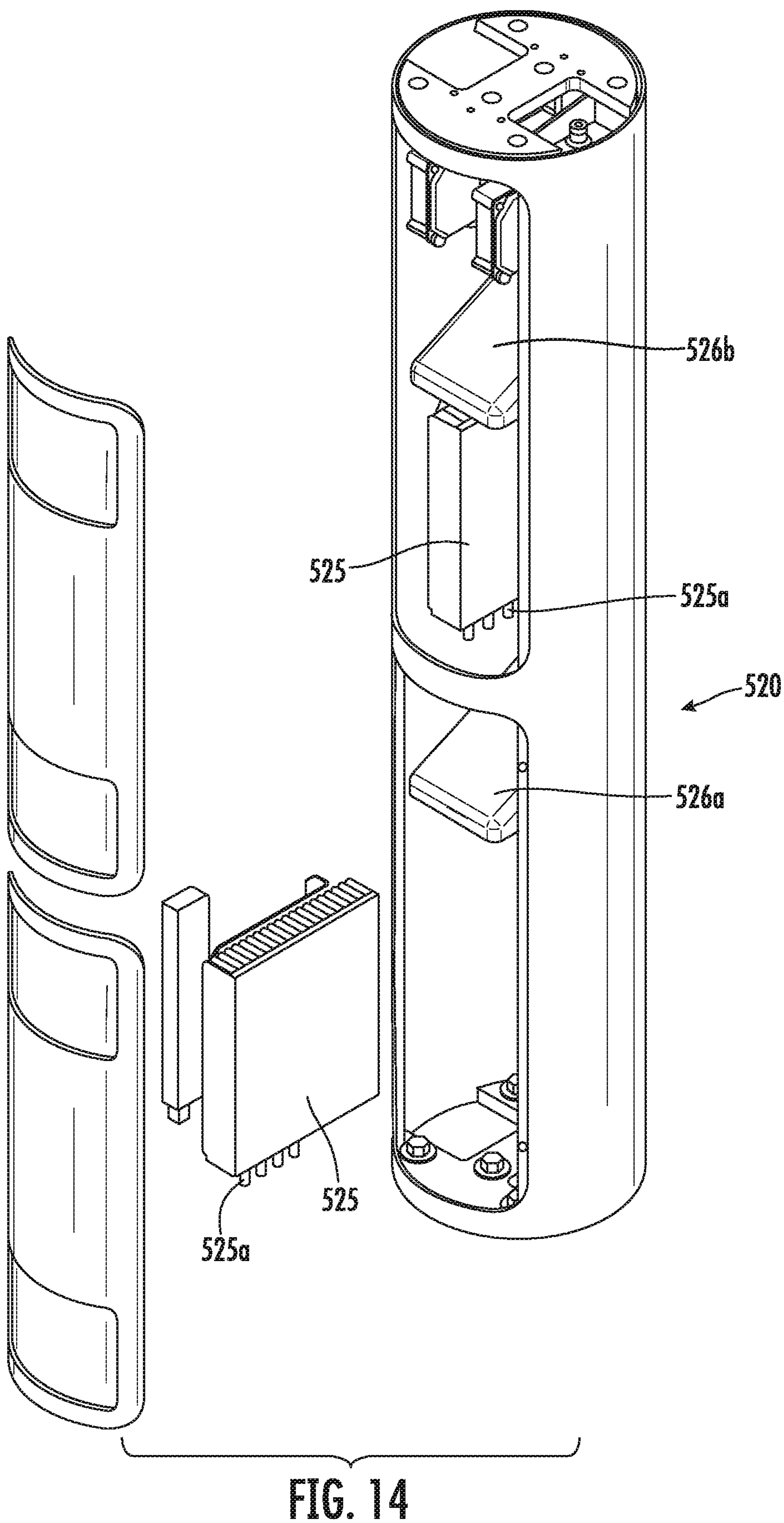
FIG. 14 is an exploded perspective view of an alternative equipment module of the pole of FIG. 10.

Referring now to FIGS. 10 and 14, the equipment module 520 is illustrated therein. The equipment module 520 is similar to the equipment module 420, with the exception that only two RRUs 525 (which are of a different size and configuration) are mounted within the module 520, each beneath one of the baffles 526*a*, 526*b*. It can also be seen in FIG. 13 that connectors 525*a* on the RRUs 525 are on the underside of each RRU 525, which can facilitate interconnection of cables to the RRU 525.

Figure 15:
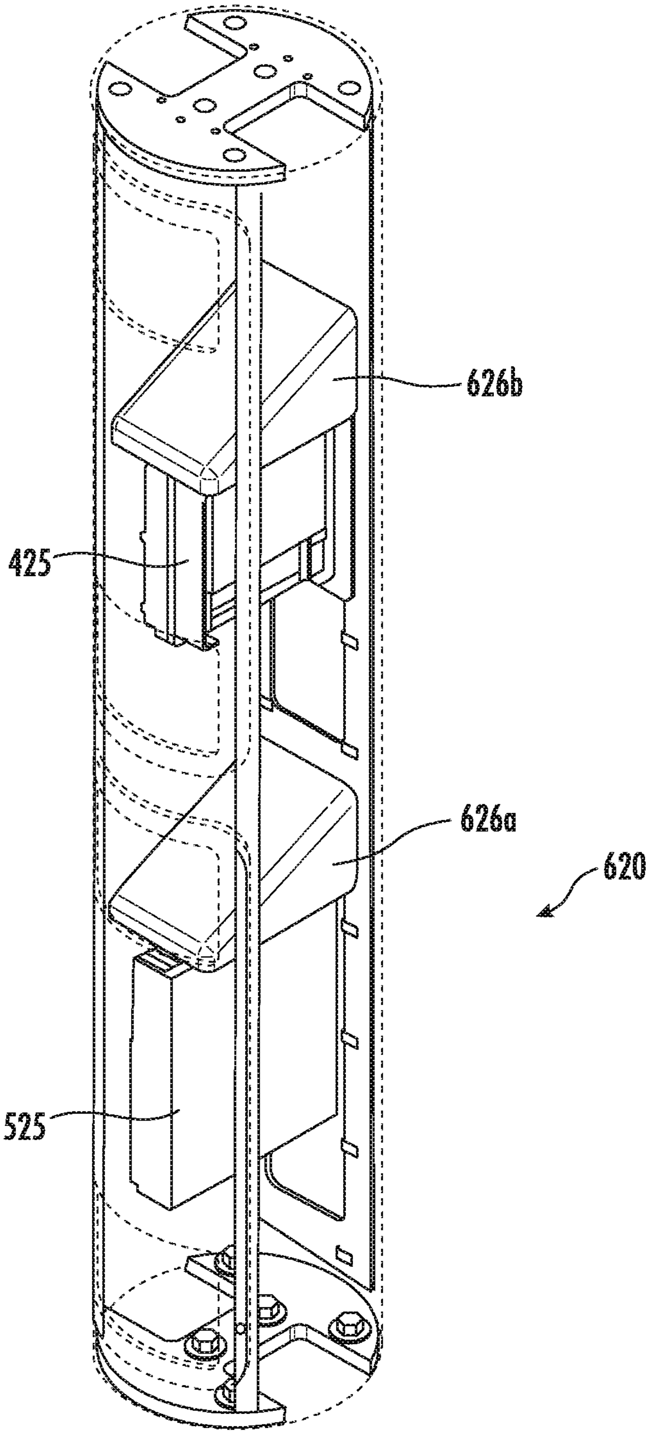
FIG. 15 is an exploded perspective view of yet another alternative equipment module of the pole of FIG. 10.
Figure 16:
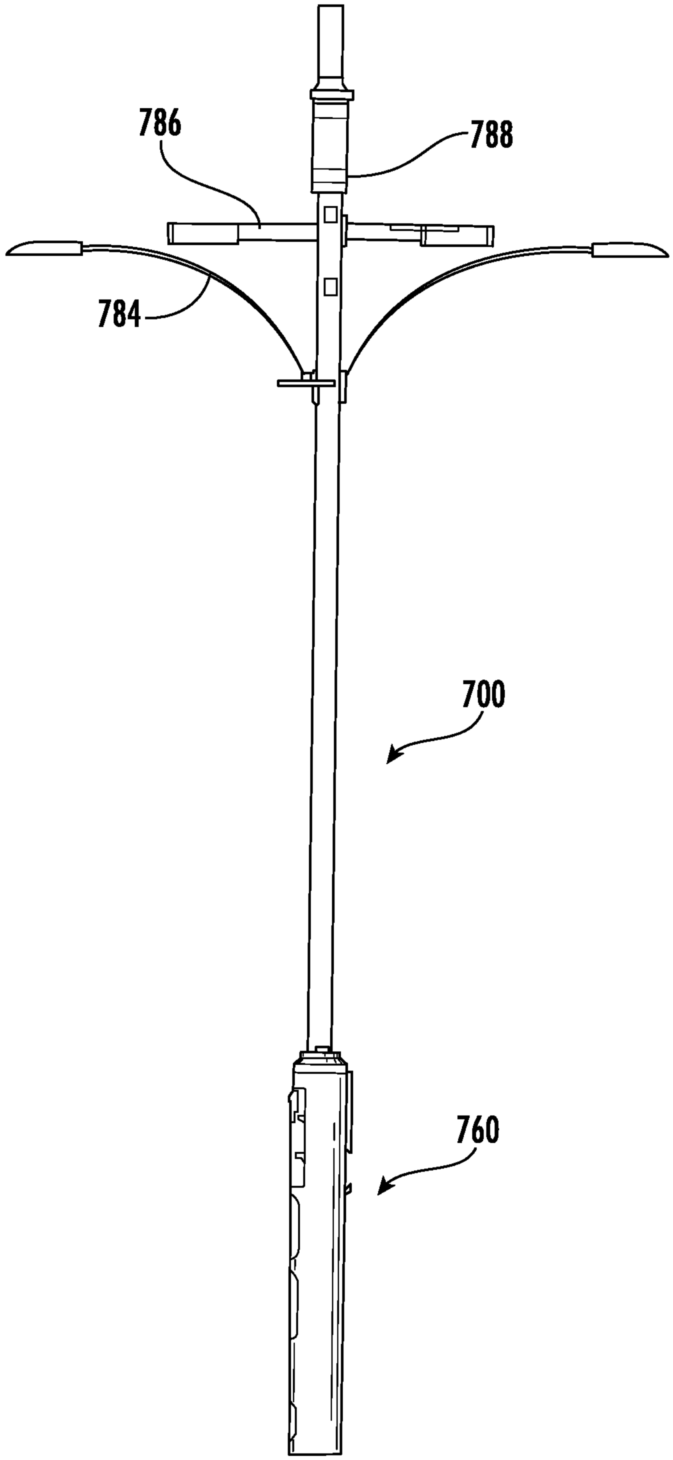
FIG. 16 is a side view of another telecommunications pole in the form of a streetlight according to embodiments of the invention.
Figure 17:
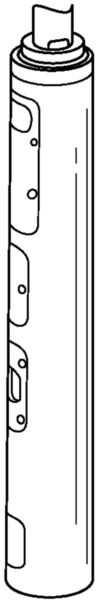
FIG. 17 is a perspective view of the power and equipment module of the pole of FIG. 16.
Figure 18:
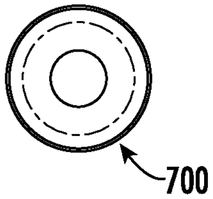
FIG. 18 is a bottom section view of the power and equipment module of FIG. 17.
Figure 19:
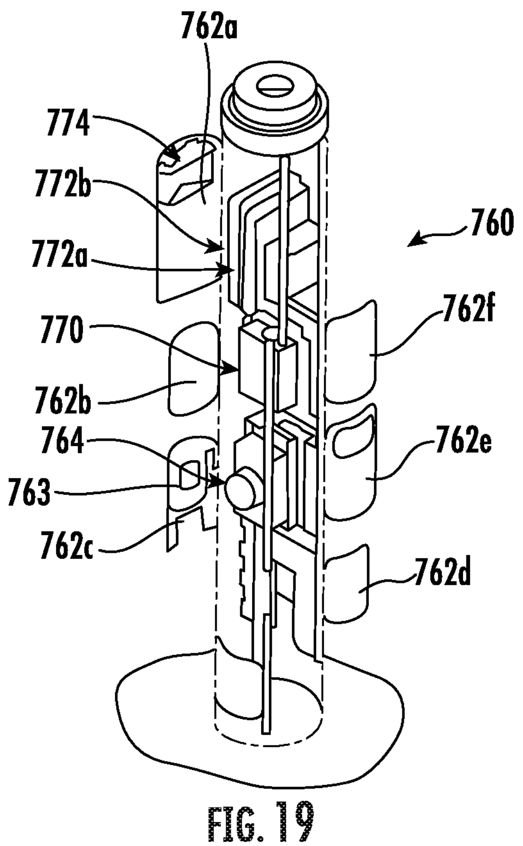
FIG. 19 is an exploded front perspective view of the power and equipment module of FIG. 17.
Figure 20:
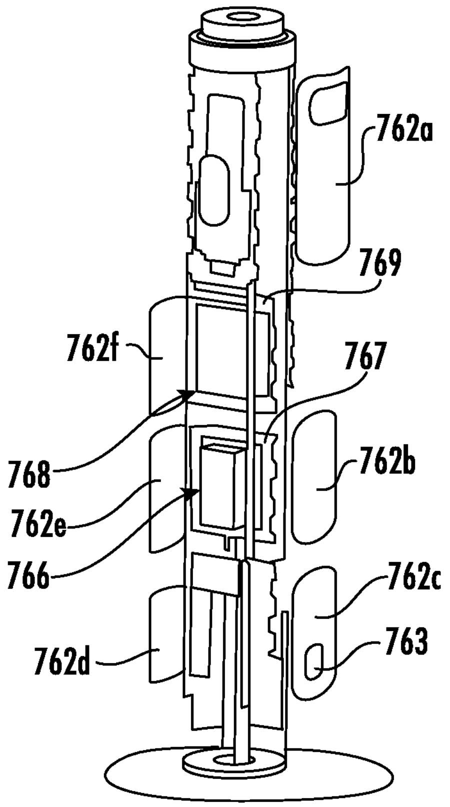
FIG. 20 is an exploded rear perspective view of the power and equipment module of FIG. 17.

Referring now to FIGS. 10 and 15, the equipment module 620 is similar to the equipment modules 420, 520, with the exception that the module 620 includes one RRU 525 and one RRU 425 mounted therein. The baffles 626*a*, 626*b* are mounted as in the equipment modules 420, 520 and create similar air flow patterns.

Referring back to FIGS. 10, the antenna module 410 includes a canister antenna (not visible in FIG. 10). An exemplary canister antenna is Model No. 4VPP-360s-F, available from CommScope, Inc. (Hickory, North Carolina). Exemplary antennas are also discussed in U.S. Pat. No. 9,433,034, the disclosure of which is hereby incorporated herein by reference.

Referring now to FIGS. 16-21, another monopole, designated broadly at 700, is shown therein. The monopole 700 includes a power and equipment module 760 as the base. The power and equipment module 760 includes three doors 762*a-f* on each side that provide access to the cavity of the module 760. The door 762*a* includes a transparent window 763 that provides visual access to the cavity. The equipment mounted within the module 760 includes a power meter 764 (which is visible through the window 763), a main disconnect 766 mounted to the same panel 767 as the power meter 764), an AC/DC rectifier 768 mounted to the same panel 769 as an AC load center 770, two RRUs 772*a*, 772*b* mounted to a panel 771, and a cooling system 774 mounted to the inside of the door 762*c*.

At its upper portion, the monopole 700 includes optional luminaire arms 784 and/or 786 (two different configurations are shown). A concealment module 790 is mounted above the luminaire arms 786, and a canister antenna 788 is mounted above the concealment module 790.

Figure 21:
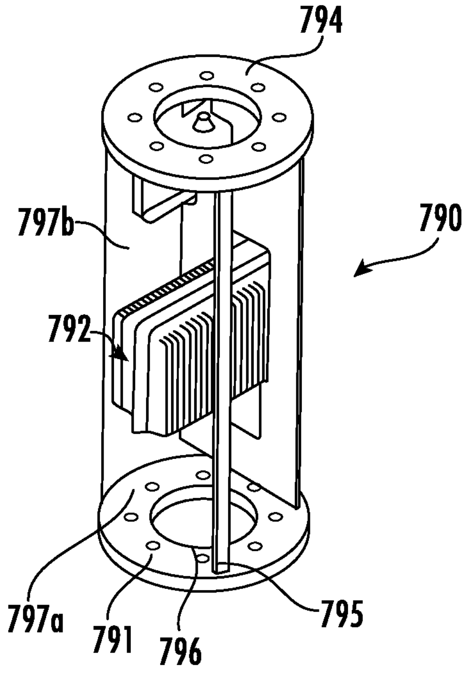
FIG. 21 is a cutaway perspective view of the radio concealment module of the pole of FIG. 16.

As can be seen in FIG. 21, the concealment module 790 includes an RRU 792 mounted to a panel 793. A floor 791 is connected with a ceiling 794 via supports 795. A door 796 with vents 797*a*, 797*b* provides access to the interior of the concealment module 790.

Figure 22:
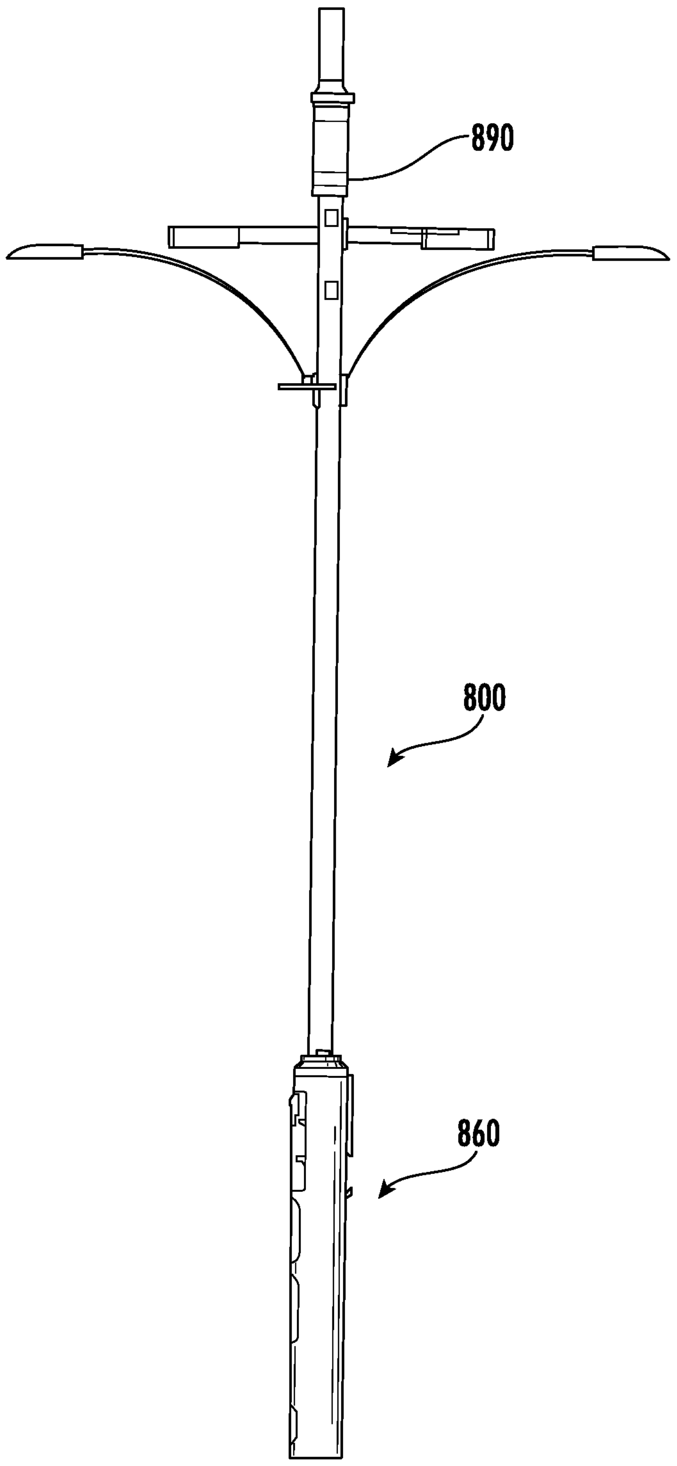
FIG. 22 is a side view of still another telecommunications pole in the form of a streetlight according to embodiments of the invention.
Figure 23:
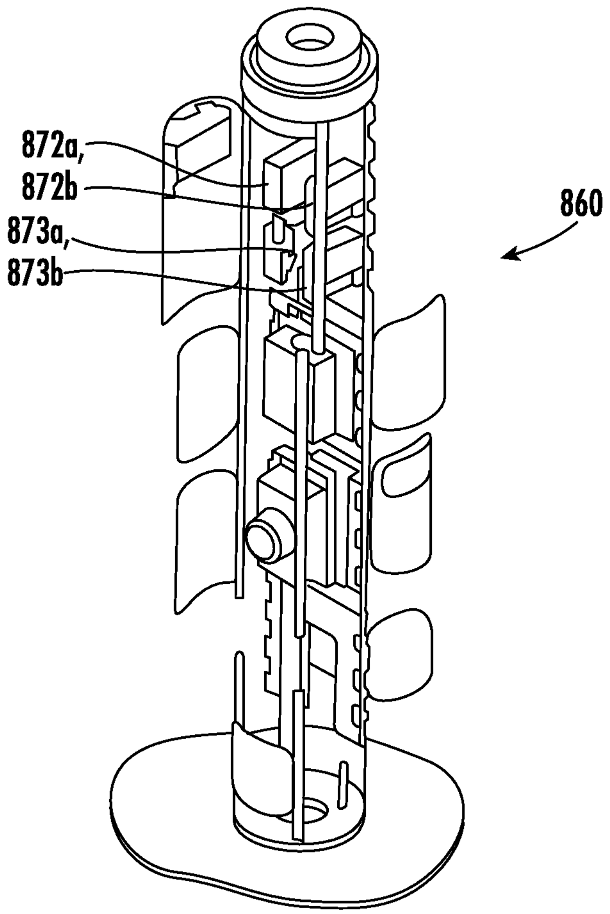
FIG. 23 is a front perspective view of the power and equipment module of the pole of FIG. 22.
Figure 24:
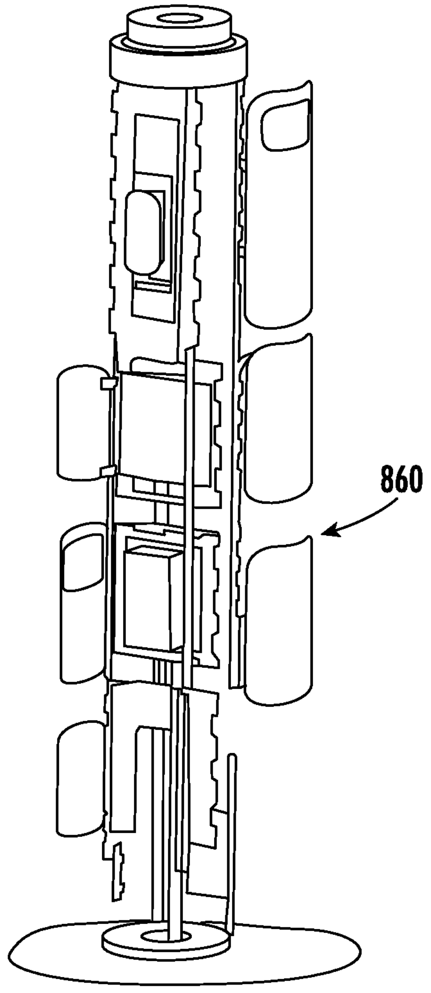
FIG. 24 is a rear exploded perspective view of the power and equipment module of the pole of FIG. 22.

Referring now to FIGS. 22-24, another monopole, designated broadly at 800, is shown therein. The monopole 800 is similar to the monopole 700 with the exception of the power and equipment module 860, which includes somewhat different components. More specifically, the power and equipment module 860 lacks an AC/DC rectifier, and includes two RRUs 872*a*, 872*b* and two diplexers 873*a*, 873*b*. In some embodiments, the concealment module 890 may take a slightly different configuration.

Figure 25:
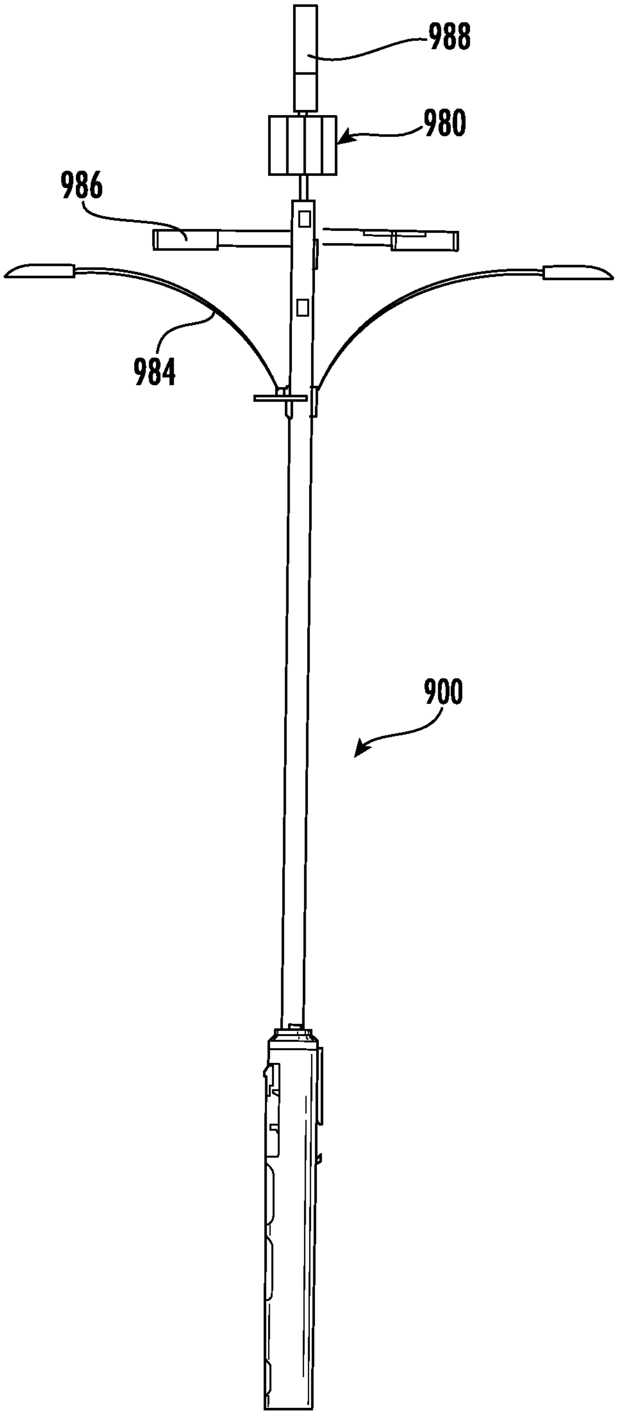
FIG. 25 is a side view of a further telecommunications pole in the form of a streetlight according to embodiments of the invention.
Figure 26:
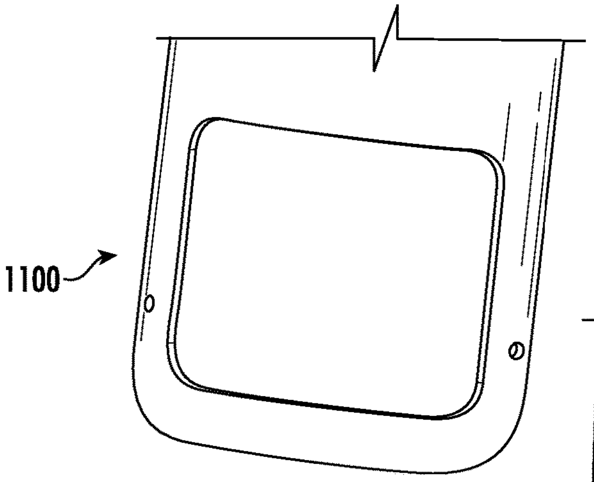
FIG. 26 is a front perspective view of a door with a perforated panel for monopole modules according to embodiments of the invention.

Referring now to FIG. 25, another monopole, designated broadly at 900, is shown therein. The monopole 900 is similar to the monopole 800 with the exceptions that (a) there is no concealment module mounted above the luminaire arms 984, 986, (b) the canister antenna 988 is of a slightly different configuration, and (c) an antenna module 980 is mounted beneath the canister antenna 988.

Each of the modules 450, 420, 520, 620, 760, 790, 860, 980 mentioned above may include equipment that generates heat (for example, the equipment modules 420, 520, 620, 760, 790, 860 typically house remote radio units (RRUs)). To enable heat to be removed from the modules 420, 520, 620, 760, 790, 860, 980, they include perforated sections (e.g., perforated section 431 in module 420) that provide entry and exit locations for cooling air. In many instances the perforated sections are attached to doors mounted on the outer shell of the module.

Referring now to FIGS. 26-29, an exemplary door 1100 with a perforated panel 1120 is shown therein. The perforated panel 1120, which includes an optional outer frame 1122 and a perforated section 1124 (typically formed of metal or plastic), is mounted to the interior surface of the door 1100 as described below.

An elongate bracket 1102 is mounted at either end to the inner surface of the door 1100. A mounting hole 1104 is located in the center of the bracket 1102. A vent retainer 1106 is generally L-shaped in profile, with a main panel 1108 and a shorter spacing panel 1110. The main panel 1108 includes a hole 1112. The spacing panel 1110 may have an arcuate free edge 1111 that is configured to match the contour of the inner surface of the frame 1122.

A clip nut 1114 with prongs 1114*a*, 1114*b* fits over the bracket 1102, such that threaded holes (not shown) in the prongs 1114*a*, 1114*b* align with the hole 1104. The vent retainer 1106 is positioned with the main panel 1108 bearing against the prong 1114*a* and the bracket 1102, and the edge of the spacing panel 1110 bearing against the inner surface of the frame 1122 of the perforated panel 1120. In this position, the hole 1112 aligns with the hole 1104 and the holes in the prongs 1114*a*, 1114*b*. A threaded fastener 1116 (shown as an Allen bolt) is inserted through the hole 1112 in the vent retainer 1106, the hole in the prong 1114*a*, the hole 1104 in the bracket 1102, and the hole in the prong 1114*b*. Tightening the fastener 1116 secures the main panel 1108 against the bracket 1102 and/or the prong 1114*a*, and forces the spacing panel 1110 against the frame 1122 of the perforated panel 1120.

Figure 27:
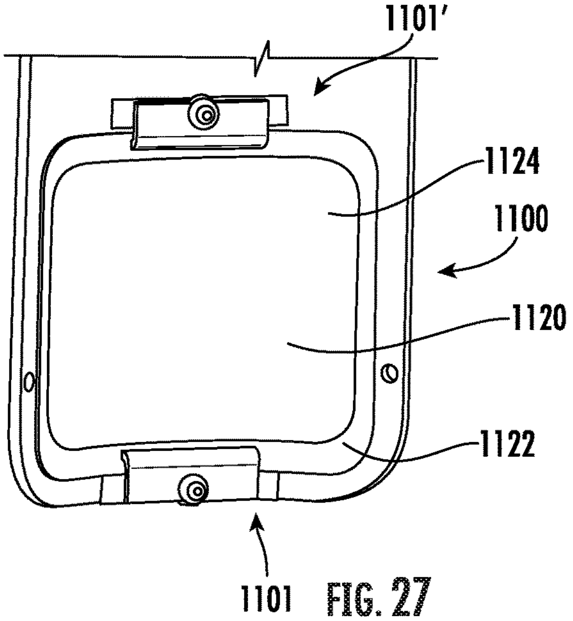
FIG. 27 is a rear perspective view of the door of FIG. 26.
Figure 28:
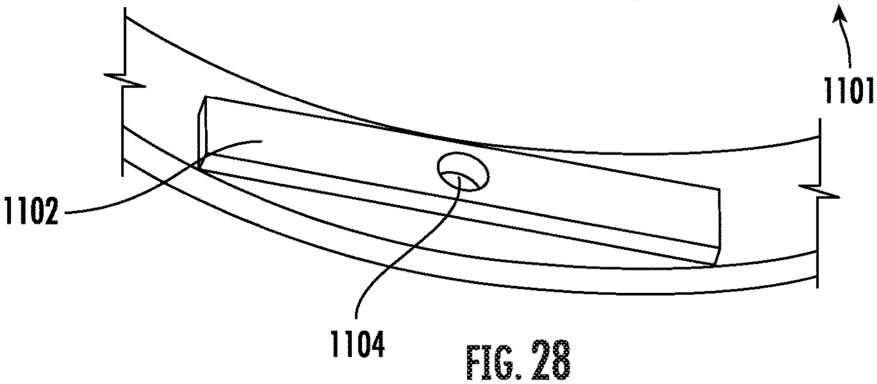
FIG. 28 is an enlarged bottom, rear perspective view of a bracket used to mount the door of FIG. 26.

As shown in FIG. 27, a mirror image arrangement of the bracket 1102, vent retainer 1106, clip nut 1114 and fastener 1116 is employed on the upper and lower edges of the perforated panel 1120. The two assemblies together (designated at 1101, 1101' in FIG. 27) maintain the perforated panel 1120 in place on the door 1100. It should be noted that the use of the assemblies 1101, 1101' enables the perforated panel 1120 to be mounted on the door 1100 without any external fasteners, which can both improve the external appearance of the monopole 400 and eliminate potential issues with such fasteners (such as rust and the like).

Those skilled in this art will appreciate that the assemblies 1101, 1101' may be mounted on the sides of the perforated panel 1100 rather than on the upper and lower edges. In such an instance, the bracket 1102 may include short spacing members at its ends to enable the bracket 1102 to remain spaced from the inner surface of the door 1100. Also, in such an instance the free edge of the spacing panel 1110 of the vent retainer 1106 may be straight rather than arcuate to match the straight surface of the door 1100 at that location.

Figure 29:
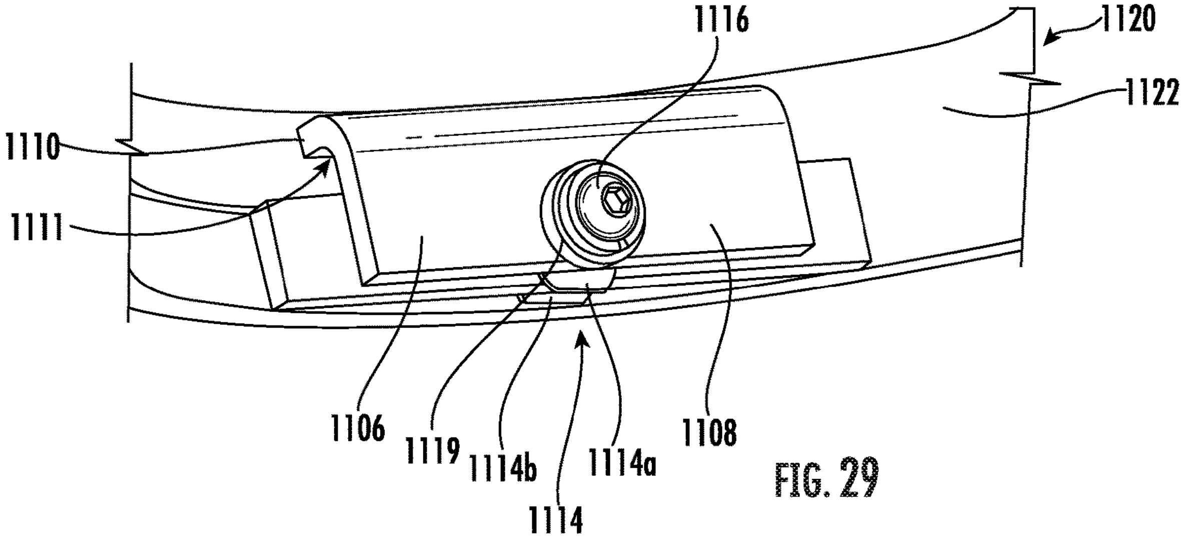
FIG. 29 is an enlarged bottom, rear perspective view of the bracket of FIG. 28 with a vent retainer mounted thereon to secure the door of FIG. 26.

Those of skill in this art will also appreciate that the fastener 1116 can be secured in other ways. For example, the clip nut 1114 may be replaced with one or two nuts fixed to the bracket 1102 (one or either side of the bracket 1102, or nuts on both sides of the bracket 1102). Also, as shown in FIG. 29, one or more washers 1119 may be included to spread the holding force of the fastener 1116 across a greater area of the vent retainer or to reduce the likelihood of the fastener 116 loosening while in place.

In addition, the vent retainer 1106 may take different forms. For example, the hole 1112 may instead be an open-ended slot that would facilitate insertion and/or tightening of the fastener 1116. Also, in the illustrated embodiment, the spacing panel 1110 is shown as being generally perpendicular to the main panel 1108, but this angle may be varied in other embodiments.

Figure 30:
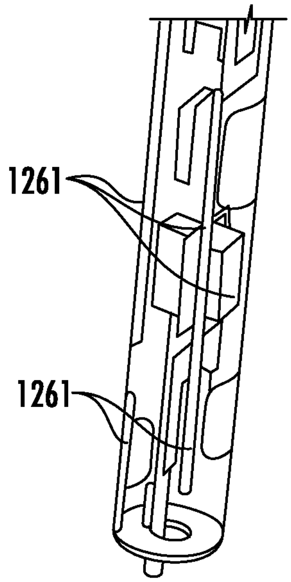
FIG. 30 is a power and equipment module according to embodiments of the invention with a number of stiffening elements attached inside.

As illustrated in FIG. 30, a power and equipment module 1260 may include a number of stiffening elements 1261 affixed to the inner surface of the module 1260. Each stiffening element 1261 may be positioned near the doors 1262*a-f*. In some embodiments, the stiffening elements 1261 may be oriented in a vertically within the module 1260. In some embodiments, the stiffening elements 1261 may be affixed to the inner surface of the module 1260 by welding. Additionally, in some embodiments, at least one stiffening element 1261 may be placed next to each door 1262*a-f*. In other embodiments, a single stiffening element 1261 may extend proximate to multiple adjacent doors 1262*a-f* (e.g., proximate to two doors, one of which is directly above the other).

Figure 31:
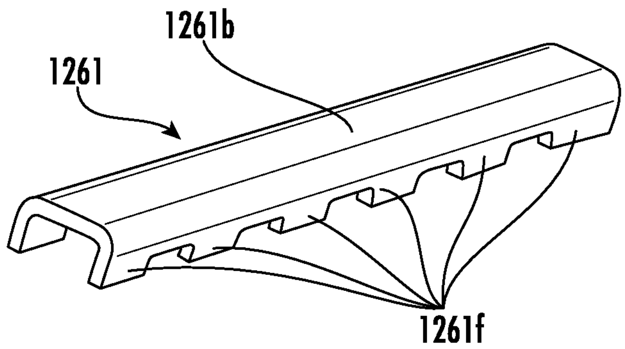
FIG. 31 is a front perspective view of one of the stiffening elements of FIG. 30.
Figure 32:
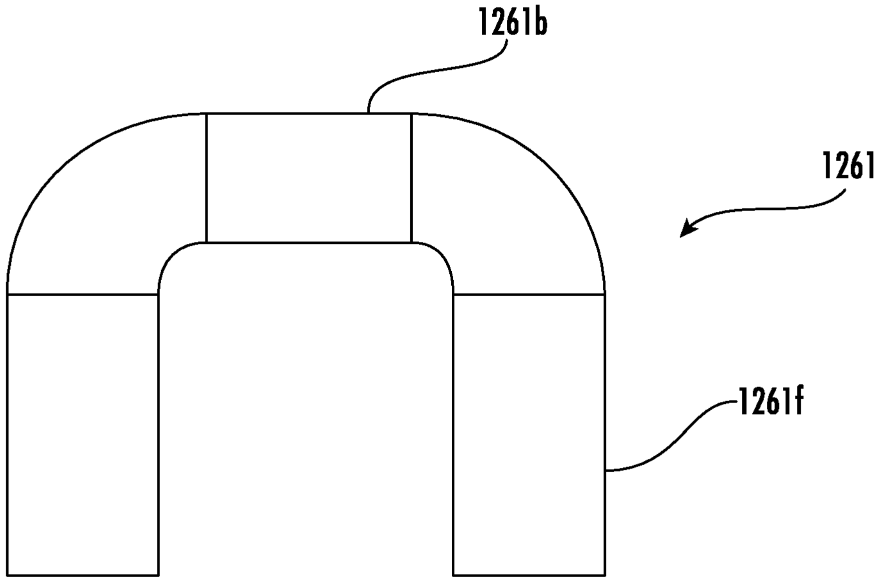
FIG. 32 is a section view of the stiffening element of FIG. 31.

Referring now to FIGS. 31 and 32, each stiffening element 1261 includes a substantially rectangular base 1261*b* with rounded lateral edges. Each stiffening element 1261 includes multiple flanges 1261*f* protruding in a substantially perpendicular direction relative to the base 1261*b* from the rounded lateral edges of the base 1261*b*. Each stiffening element 1261 may therefore have a C-shaped cross-section. The flanges 1261*f* of the stiffening elements 1261 may provide engagement surfaces that contact the inner surface of the module 1260. In some embodiments, the length of each flange 1261*f* may be substantially equal to length of the space between adjacent flanges 1261*f*. Additionally, in some embodiments, the flanges 1261*f* may be of varying lengths, with longer flanges 1261*f* closer to the end of the stiffening element 1261.

In some situations, the inclusion of doors 1262*a-f* in the power and equipment module 1260 may cause some degree of structural weakening of the walls in the region proximate the doors 1262*a-f*. This weakening may cause the walls of the power and equipment module 1260 to slightly bow outward in the region proximate the doors 1262*a-f*, particularly if the doors 1262*a-f* are cut from the remainder of the power and equipment module 1260. However, the addition of stiffening elements 1261 to the inside of the power and equipment module 1260 may provide several benefits. First, the stiffening elements 1261 may generally increase the stiffness of the walls of the module 1260, allowing the power and equipment module 1260 to withstand greater levels of stress without yielding. Furthermore, the inclusion of stiffening elements 1261 may decrease or eliminate the effects of bowing out in the regions of the module 1260 proximate the doors 1262*a-f*, thus allowing the power and equipment module 1260 to return to its original shape. This can be desirable if the door 1262*a-f* itself is the portion of the power and equipment module 1260 removed during cutting.

When compared to a stiffening element without flanges, a stiffening element 1261 with flanges 1261*f* may provide several advantages. A stiffening element 1261 with flanges 1261*f* may be lighter and less expensive to produce as it may use less material than a stiffening element without flanges. Furthermore, a stiffening element 1261 with flanges 1261*f* may require less welding in order to affix it to the inner surface of a power and equipment module 1260 than a stiffening element without flanges. Because the inner surface of the tube-shaped power and equipment module 1260 may be a challenging location in which to weld objects, the inclusion of flanges 1261*f* on the stiffening element 1261 may therefore allow one to save considerable time and effort when creating or installing the module 1260.

Those skilled in this art will appreciate that the stiffening elements 1261 may be of varying lengths. Furthermore, each stiffening element 1261 may include any number of flanges 1261*f*, which may be of varying lengths and spaced at varying intervals. In some embodiments, the bases 1261*b* of the stiffening elements 1261 may have chamfered sides, rather than rounded ones. In further embodiments, the flanges 1261*f* of each stiffening element 1261 may extend at a right angle from the edges of the flat surface of the base 1261*b*.

Furthermore, those skilled in this art will recognize that the stiffening elements 1261 are not limited to use within a power and equipment module 1260. The stiffening elements 1261 may also be affixed to the inside surface of any pole (e.g., a monopole) that includes a cavity with an inside surface to which the stiffening elements 1261 may be attached.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A modular monopole for wireless communications, comprising:

an antenna module having a floor, a ceiling and a side wall that form an antenna compartment, the antenna module having a first hollow post extending between the floor and the ceiling, wherein at least one antenna resides within the antenna compartment;

a radio module having a floor, a ceiling and a side wall that form a radio compartment, the radio module having a second hollow post extending between the floor and the ceiling, wherein at least one remote radio unit (RRU) resides within the radio compartment;

a distribution module having a floor, a ceiling, and a side wall that form a distribution compartment, the distribution module having a third hollow post extending between the floor and the ceiling, wherein at least one cable distribution unit resides within the distribution compartment, the cable distribution unit configured to break out power conductors and optical fibers from a hybrid trunk cable for distribution to the at least one RRU;

a base; and a cooling module in the base;

wherein the base, the radio module, the antenna module, and the distribution module are arranged in vertically stacked relationship, with the base residing below the radio module and the distribution module, and the antenna module residing above the radio module, and wherein the first hollow post, the second hollow post, and the third hollow post, each have an opening in fluid communication with the cooling module and the cooling module is configured to force cool air upwardly through the first, second and third hollow posts, and out of the openings into the respective modules.

2. The modular monopole defined in claim 1, wherein the radio module includes:

an intake section in the side wall;

an exit section in the side wall, the exit section being above the intake section; and at least one baffle positioned within the radio compartment that directs air that enters the radio module through the intake section to exit the radio module through the exit section.

3. The modular monopole defined in claim 2, wherein the exit section is located on a side of the side wall opposite the intake section.

4. A modular monopole for wireless communications, comprising:

an antenna module having a floor, a ceiling and a side wall that form an antenna compartment, wherein at least one antenna resides within the antenna compartment;

a radio module having a floor, a ceiling and a side wall that form a radio compartment, wherein at least one remote radio unit (RRU) resides within the radio compartment; and a base;

wherein the base, the radio module, and the antenna module are arranged in vertically stacked relationship, with the base below the radio module and the antenna module above the radio module, wherein the radio module includes: an intake section in the side wall; an exit section in the side wall, the exit section being above the intake section; and at least one baffle positioned within the radio compartment that directs air that enters the radio module through the intake section to exit the radio module through the exit section, wherein the exit section is located on a side of the side wall opposite the intake section, wherein the at least one RRU is first and second RRUs, the second RRU being positioned above the first RRU, the radio module further including:

a second intake section in the side wall of the radio module;

a second exit section in the side wall of the radio module, the second exit section being above the second intake section; and at least one second baffle positioned within the radio compartment that directs air that enters the second radio module through the second intake section to exit the second radio module through the second exit section.

* * * * *